United States Patent [19]

Vaynshteyn

[11] Patent Number: 4,801,793

[45] Date of Patent: Jan. 31, 1989

[54] ORIENTATION INDICATING DEVICE

[75] Inventor: Mikhail Vaynshteyn, Rochester, N.Y.

[73] Assignee: Eastman Kodak Company, Rochester, N.Y.

[21] Appl. No.: 143,411

[22] Filed: Jan. 13, 1988

[51] Int. Cl.⁴ .............................................. G03B 17/20
[52] U.S. Cl. ................................ 354/289.12; 354/471; 354/106
[58] Field of Search ............ 354/465, 471, 106, 269.1, 354/289.11, 289.12

[56] References Cited

U.S. PATENT DOCUMENTS 3,675,549 7/1972 Adair .................................... 354/64
4,183,645 1/1980 Ohmura et al. ..................... 354/106

Primary Examiner—Michael L. Gellner
Attorney, Agent, or Firm—Roger A. Fields

[57] ABSTRACT

An orientation indicating device visibly indicates, preferably in the viewfinder of a camera, that the camera is deviated improperly from its normal horizontal position for picture-taking. The device comprises a pendulum controlled indicating circuit including electrically activated display means for indicating before a picture is taken that the camera is deviated inclined-left or inclined-right from horizontal, and therefore the picture should not be taken.

10 Claims, 1 Drawing Sheet

ORIENTATION INDICATING DEVICE

BACKGROUND OF THE INVENTION

1. Field of the Invention

The invention relates generally to the field of photography, and specifically to an orientation indicating device for indicating whether or not a camera is oriented in a proper position to take a picture. More particularly, the invention relates to an orientation indicating device for visibly indicating in the viewfinder of a camera that the camera is properly oriented in a normal horizontal or vertical picture-taking position.

2. Description of the Prior Art

Orientation indicating devices to facilitate accurate horizontal alignment of cameras are generally well known. Typically, a spirit level has been used as an orientation indicating device for a camera. The spirit level consists essentially of a sealed glass tube filled with a liquid, leaving a small air bubble. As long as the tube is truly horizontal, the bubble will lie exactly between reference marks in the middle of the tube. If the tube is inclined left or inclined right along its length, the bubble will move to the right or the left of the reference marks. However, even though the spirit level is located in the viewfinder of the camera, to permit adjustment of the level at the same time the subject to be photographed is framed in the viewfinder, it is not a simple task to center the bubble. Thus most people prefer to ignore the spirit level.

Other devices have been proposed, such as described in U.S. Pat. No. 3,675,549, granted July 11, 1972, and U.S. Pat. No. 4,183,645, granted Jan. 15, 1980, which record an indication of the orientation of the camera during picture-taking, proximate each frame area of the film. In U.S. Pat. No. 3,675,549, a pendulum is supported to swing in front of an arcuate array of holes through which respective beams of light are projected onto the film. Since the pendulum will block at least one of the holes in accordance with the deviation of the camera from vertical, the resulting image formation on the film will indicate such deviation. In U.S. Pat. No. 4,183,645, a pendulum operates as a switch contact to operate respective means for projecting an image of the photographing date within the frame area in accordance with whether the camera is oriented in its normal horizontal position or in a vertical position 90° from the horizontal position. If the camera is oriented in its horizontal position, the image of the date is recorded along one of the longer edges of the frame area. If the camera is in its vertical position, the image of the date is recorded along one of the shorter edges of the frame area. In both of the patents, the operator of the camera does not receive any indication before a picture is taken whether or not the camera is in a proper position to take the picture. The only information relating to the orientation of the camera is recorded on the film, and therefore it is not available until after the film is developed.

SUMMARY OF THE INVENTION

The above-described problems existing in prior art devices are believed to be solved by the invention.

According to the invention, an orientation indicating device visibly indicates, preferably in the viewfinder of a camera, that the camera is deviated improperly from a normal horizontal position for picture-taking. Specifically, the device comprises:

(a) orientation indicating means electrically activatable to provide a visible indication that the camera is deviated from horizontal, as for example deviated inclined-left or inclined-right from horizontal; and (b) pendulum switch means operating in response to the camera being deviated improperly from horizontal for activating the orientation indicating means before a picture can be taken.

Preferably, the pendulum switch means includes a pendulum-like contact swingably suspended from a fixed point but urged to remain vertical by gravity and a plurality of spaced fixed contacts disposed to make respective electrical contact with the pendulum-like contact as the camera is deviated inclined-left or inclined-right from horizontal.

Thus there is provided an orientation indicating device which provides a visible indication before the picture is taken that the camera is not properly positioned for picture-taking and which is relatively simple to read.

DESCRIPTION OF THE PREFERRED EMBODIMENT

Figure 2:
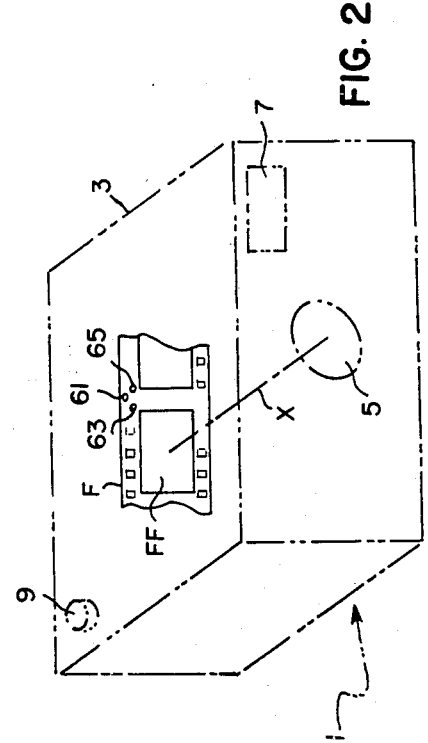
FIG. 2 is a perspective view of a camera employing the orientation indicating device depicted in FIG. 1.

Referring now to the drawings, and in particular to FIG. 2, there is illustrated known features of a 35 mm still camera 1 including a camera body 3, a taking lens 5 having an optical axis X, a viewfinder 7, and a manually depressible shutter release button 9. A longitudinal section of a 35 mm filmstrip F is shown within the camera body 3, specifically the film frame FF positioned for exposure in the focal plane of the lens 5.

Figure 3:
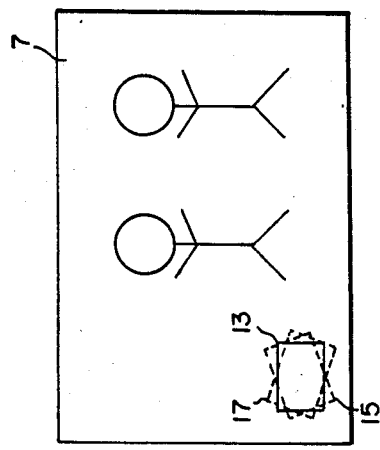
FIG. 3 is an elevation view of the viewfinder of the camera depicted in FIG. 2, as seen through the eye of the photographer.

According to the invention, there is provided an orientation indicating device 11 for visibly indicating in the viewfinder 7 that the camera body 3 is oriented in a normal horizontal position to take a horizontal format picture, such as a landscape, is oriented in either one of two reversed vertical positions to take a vertical format picture, such as a portrait, or is oriented in a position deviated improperly from horizontal or vertical, in which case a picture should not be taken. As shown in FIGS. 2 and 3, the orientation indicating device 11 includes a horizontal/vertical orientation display 13, depicted in solid line, an inclined-left (or inclined counterclockwise) orientation display 15, depicted in broken line, and an inclined-right (or inclined clockwise) display 17, depicted in broken line, each of which is electrically activatable before a picture is taken to provide respective visible indications in the viewfinder 7 that the camera body 3 is oriented in a normal horizontal or vertical position for picture-taking or is deviated improperly from horizontal or vertical. The three orientation displays 13, 15, and 17 have approximately the same proportion of length to width as the viewfinder 7, and they each comprise either conventional liquid crystal displays (LCD's) or respective serial arrays of conventional light emitting diodes (LED's) which are rendered visible when activated electrically. Preferably, the orientation displays 15 and 17 are broken line or segmented displays to facilitate their distinction from the orientation display 13, which is a solid line or continuous display. In addition, the orientation displays 15 and 17 may be flashed on and off (when electrically activated) by a known pulse circuit, not shown.

To electrically activate the respective displays 13, 15, and 17, the orientation indicating device 11 includes a pendulum switch 19 comprising a pendulum-like contact 21 swingably supported from an electrically conductive pivot pin 23 fixed to the camera body 3 and a plurality of spaced immobile contacts 25, 27, 29, 31, 33, 35, and 37, fixed to the camera body. The immobile contacts 25, 27, 29, 31, 33, 35, and 37 are disposed along a semicircular line to make respective electrical contact with the pendulum-like contact 21 as the camera body 3 is oriented about the optical axis X. The pendulum-like contact 21 has a bottom weight 39, ensuring that the contact is urged to remain vertical by gravity. A dampener, such as a relatively light torsional spring, not shown, may be included to dampen or slow down rotational motion of the pendulum-like contact 21 relative to the pivot pin 23 as the camera body 3 is oriented about the optical axis X.

The pendulum-like contact 21 is shown in FIG. 3 in electrical contact with the immobile contact 25. This is the rotational position the pendulum-like contact occupies when the camera body 3 is properly oriented in its horizontal position to take a picture. In this instance, the horizontal/vertical display 13 can be electrically activated. If the pendulum-like contact 21 is in electrical contact with either one of the immobile contacts 27 or 29, the camera body 3 will be properly oriented in a corresponding one of its two reversed vertical positions. In this instance (as in the former one), the horizontal/vertical display 13 can be electrically activated. If the pendulum-like contact 21 is in electrical contact with the immobile contact 31, the camera body 3 will be improperly oriented inclined-left (i.e., counterclockwise) from horizontal or will be deviated improperly from vertical. In either instance, the inclined-left display 15 can be electrically activated. If the pendulum-like contact 21 is in electrical contact with the immobile contact 33, the camera body 3 will be improperly oriented inclined-right (i.e., clockwise) from horizontal or will be deviated improperly from vertical. In either instance, the inclined-right display 17 can be electrically activated. If the pendulum-like contact 21 is in electrical contact with the immobile contact 35, the camera body 3 will be deviated improperly from vertical. In this instance, the inclined-left display 15 can be electrically activated. If the pendulum-like contact 21 is in electrical contact with the immobile contact 37, the camera body 3 will be deviated improperly from vertical. In this instance, the inclined-right display 17 can be electrically activated.

Figure 1:
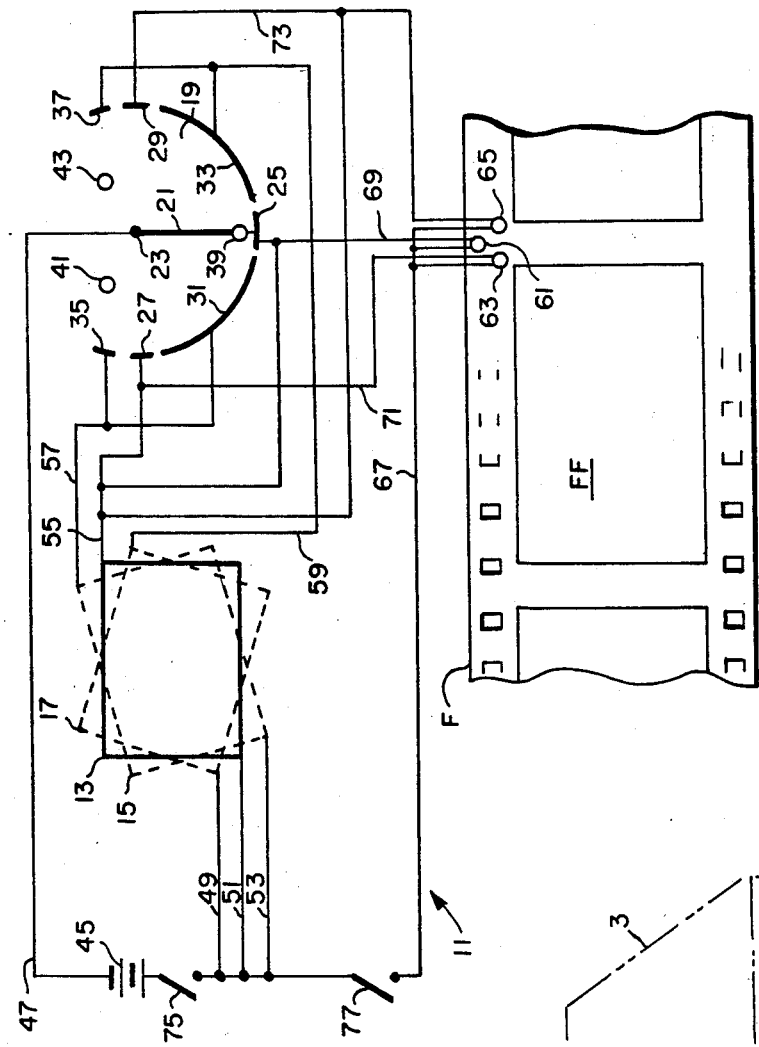
FIG. 1 is a schematic view of an orientation indicating device constructed according to a preferred embodiment of the invention.

When the camera body 3 is tilted counterclockwise in FIGS. 1 and 3 about the optical axis X from its horizontal position, the immobile contact 25 will be removed from electrical contact with the pendulum-like contact 21 and the immovable contact 35 will be put into electrical contact with the pendulum-like contact. Further movement of the camera body 3 counterclockwise about the optical axis X to one of its vertical positions will remove the immobile contact 31 from electrical contact with the pendulum-like contact 21 and put the immobile contact 27 into electrical contact with the pendulum-like contact. Counterclockwise movement of the camera body 3 from the last-mentioned vertical position will remove the immobile contact 27 from electrical contact with the pendulum-like contact 21 and put the immobile contact 35 into electrical contact with the pendulum-like contact. Similarly, electrical contact between the pendulum-like contact 21 and the immobile contacts 33, 29, and 37 will be effected when the camera body 3 is tilted clockwise about the optical axis X from its horizontal position in FIG. 3. Respective stops 41 and 43 fixed to the camera body 3 limit the pendulum-like member 21 to rotational motion between the two stops.

As shown in FIG. 3, a battery 45 is connected via a lead 47 to the pivot pin 23, and thence to the pendulum-like contact 21, and is connected via respective leads 49, 51, and 53 to the three orientation displays 13, 15, and 17. The horizontal/vertical display 13 is connected via a lead 55 to the immobile contacts 25, 27, and 29. The inclined-left display 15 is connected via a lead 57 to the immobile contacts 31 and 35. The inclined-right display 17 is connected via a lead 59 to the immobile contacts 33 and 37. This arrangement enables the respective orientation displays 13, 15, and 17 to be electrically activated in accordance with whichever one of the immobile contacts 25, 27, 29, 31, 33, 35, and 37 makes electrical contact with the pendulum-like contact 21.

Spaced light emitting diodes (LED's) 61, 63, and 65 are connected via a lead 67 to the battery 45 and are connected via respective leads 69, 71, and 73 to the immobile contacts 25, 27, 29. The respective light emitting diodes 61, 63, and 65 are electrically activated in accordance with whichever one of the three immobile contacts 25, 27, and 29 makes electrical contact with the pendulum-like contact 21. Only one light emitting diode can be activated each time a picture is taken. As shown in FIG. 3, the light-emitting diodes 61, 63, and 65 are located adjacent the film frame FF to affirmatively encode the film frame with an indication that the camera body 3 is oriented in its horizontal position or in one of its vertical positions during picture-taking. These encodements according to custom are used by the photofinisher during the printing sequence.

In operation, the shutter release button 9 is first manually depressed half-way. This closes a normally open switch 75 to electrically activate one of the three orientation displays 13, 15, and 17. If the inclined-left display 15 or the inclined-right display 17 is visible in the viewfinder 7, the camera body 3 is deviated improperly from horizontal or vertical and should be corrected. If the horizontal/vertical display 13 is visible in the viewfinder 7, the camera body 3 is properly oriented for picture-taking. Then, the shutter release button 9 is further manually depressed until it bottoms out. This initiates exposure of the film frame FF by releasing a shutter, not shown, for opening movement, and it closes a normally open switch 77 to activate one of the light-emitting diodes 61, 63, and 65.

The invention has been described with reference to a preferred embodiment. However, it will be understood that variations and modifications of the preferred embodiment can be effected without departing from the scope of the invention.

I claim:

1. An orientation indicating device for visibly indicating that a camera is deviated improperly from a normal horizontal position to take a picture, said device comprising:

orientation indicating means electrically activatable for providing a visible indication that said camera is deviated improperly from horizontal; and pendulum switch means responsive to said camera being deviated improperly from horizontal for activating said orientation indicating means before a picture can be taken.

2. An orientation indicating device as recited in claim 1, wherein said orientation indicating means includes means for visibly indicating the particular direction said camera is deviated improperly from horizontal.

3. An orientation indicating device for visibly indicating that a camera is deviated improperly from a normal horizontal position to take a picture, said device comprising:

orientation indicating means electrically activatable for providing respective visible indications that said camera is deviated inclined-left or inclined-right from horizontal; and pendulum switch means responsive to said camera being deviated inclined-left or inclined-right from horizontal for activating said orientation indicating means before a picture can be taken, to provide a corresponding visible indication.

4. An orientation indicating device as recited in claim 3, wherein said pendulum switch means includes a pendulum-like contact swingably suspended from a fixed point but urged to remain vertical by gravity and a plurality of spaced fixed contacts disposed to make respective electrical contact with said pendulum-like contact as said camera is deviated inclined-left or inclined-right from horizontal.

5. In a photographic camera of the type having a viewfinder, an orientation device for visibly indicating that said camera is properly oriented in a normal horizontal or vertical position to take a picture, said device comprising:

orientation indicating means electrically activatable for providing a visible indication in said viewfinder that said camera is oriented in its normal horizontal position or its normal vertical position; and pendulum switch means responsive to said camera being oriented in its normal horizontal or vertical position for activating said orientation indicating means before a picture can be taken.

6. An orientation indicating device as recited in claim 5, wherein said visible indication provided in said viewfinder is shaped to conform with the boundary of the eye view through the viewfinder.

7. An orientation indicating device for visibly indicating that a camera is properly oriented in a normal horizontal or vertical position to take a picture or is deviated improperly from horizontal or vertical, said device comprising:

orientation indicating means electrically activatable for providing respective visible indications that said camera is oriented in its normal horizontal or vertical position or is deviated improperly from horizontal or vertical; and pendulum switch means responsive to said camera being oriented in its normal horizontal or vertical position or being deviated improperly from horizontal or vertical for activating said orientation indicating means before a picture can be taken, to provide a corresponding visible indication.

8. An orientation indicating device as recited in claim 7, wherein said pendulum which means includes a pendulum-like contact swingably supported from a fixed point but urged to remain vertical by gravity and a plurality of spaced fixed contacts disposed to make respective electrical contact with said pendulum-like contact as said camera is oriented to its normal horizontal and vertical positions or is deviated improperly from horizontal or vertical.

9. In a photographic camera of the type having a viewfinder, an orientation indicating device for visibly indicating that said camera is properly oriented in a normal horizontal position to take a picture or is deviated improperly from horizontal, said device comprising:

orientation indicating means electrically activatable for providing respective visible indications in said viewfinder that said camera is oriented in its normal horizontal position, is deviated inclined-left from horizontal, or is deviated inclined-right from horizontal; and pendulum switch means including a pendulum-like contact swingably supported from a fixed point but urged to remain vertical by gravity and a plurality of spaced fixed contacts disposed to make respective electrical contact with said pendulum-like contact as said camera is oriented to its normal horizontal position or is deviated inclined-left or inclined-right from horizontal, for activating said orientation indicating means before a picture can be taken, to provide corresponding visible indications in said viewfinder.

10. In a photographic camera of the type having a viewfinder, an orientation indication device for visibly indicating that a camera is deviated improperly from a normal horizontal position to take a picture, said device comprising:

orientation indicating means electrically activatable for providing respective visible indications in said viewfinder that said camera is deviated inclined-left or inclined-right from horizontal; and orientation sensing means responsive to said camera being deviated inclined-left or inclined-right from horizontal for activating said orientation means before a picture can be taken, to provide a corresponding visible indication in said viewfinder.

* * * * *

UNITED STATES PATENT OFFICE
CERTIFICATE OF CORRECTION

PATENT NO. : 4,801,793
DATED : 1/31/89
INVENTOR(S) : M. Vaynshetyn

It is certified that error appears in the above-identified patent and that said Letters Patent is hereby corrected as shown below:

Column 3, Line 61, "35 should read --31--.

Column 6, Line 11, "which" should read --switch--.

Signed and Sealed this

Twenty-ninth Day of August, 1989

Attest:

DONALD J. QUIGG

*Attesting Officer*    *Commissioner of Patents and Trademarks*